D. A. BALL.
FISHING TOOL.
APPLICATION FILED OCT. 2, 1920.

1,416,930.

Patented May 23, 1922.

Inventor
David A. Ball
by Nestall and Wallace
his Attorneys

UNITED STATES PATENT OFFICE.

DAVID A. BALL, OF WHITTIER, CALIFORNIA.

FISHING TOOL.

1,416,930. Specification of Letters Patent. Patented May 23, 1922.

Application filed October 2, 1920. Serial No. 414,262.

*To all whom it may concern:*

Be it known that I, DAVID A. BALL, citizen of the United States, and residing at Whittier, in the county of Los Angeles and State of California, have invented new and useful Improvements in a Fishing Tool, of which the following is a specification.

This invention relates to a fishing tool for wells, and pertains especially to the type of fishing tool comprising a socket with slips slidably mounted therein and disposed to engage an object and expand to embrace the same, thereafter contracting and gripping the object when the tool is raised.

Fishing tools of the type above referred to have a socket with slips sliding on the internal wall thereof and so arranged that as the slips move toward the mouth of the socket they approach each other or contract. Thus, on engaging an object they are first pushed inwardly in the socket so as to expand and permit the object to enter between the slips. Upon lifting the tool the slips contract and securely grasp the object. Having once grasped the object the slips retain a grip thereon, such that it is difficult to release their hold. If the object fished for cannot be pulled, the fishing tool may be broken and left in the well. Sometimes the object may be released by jarring. It is a desideratum to be able to release the object grasped by the tool in case it cannot be raised or if it is difficult to do so, and it is the primary object of this invention to provide a tool constructed so that the object may be released.

Figure 1:
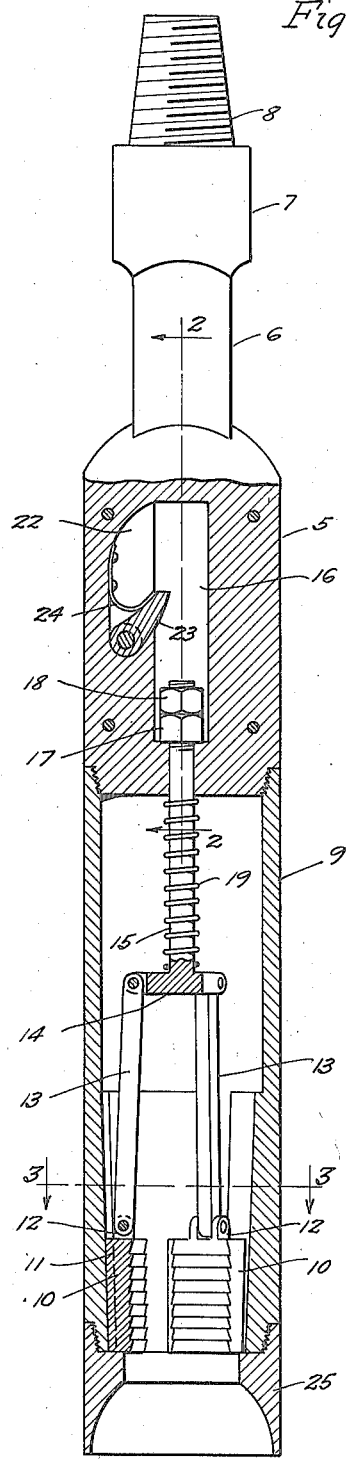
Figure 2:
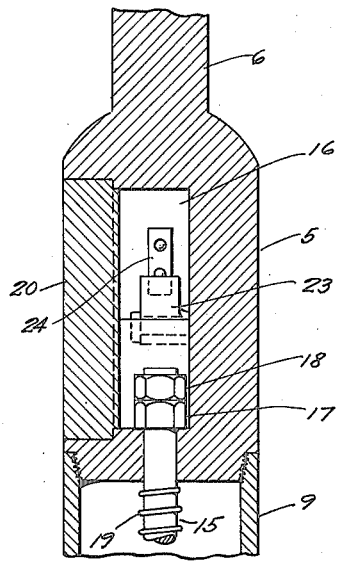
Figure 3:
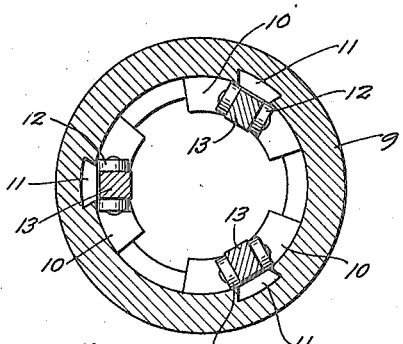
Figure 4:
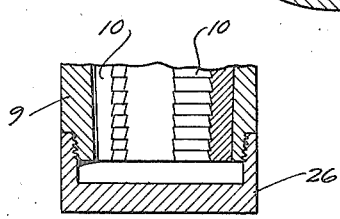

This object together with other objects and corresponding accomplishments are obtained by means of the embodiment of my invention illustrated in the accompanying drawing, in which:

Fig. 1 is a longitudinal section partly in elevation through a fishing tool; Fig. 2 is a fragmentary section as seen on the line 2—2 of Fig. 1; Fig. 3 is an enlarged section as seen on the line 3—3 of Fig. 1; and Fig. 4 is a fragmentary view showing a section through the tool with a cap mounted thereon.

Referring more particularly to the drawing, 5 indicates the body of the tool having at its upper end a shank 6 provided with a wrench hold 7 and the male member of a tool joint 8. Mounted upon the body 5 at its lower end and preferably secured thereto by means of threads is a shell 9 forming a socket. The shell is internally tapered at its lower end contracting towards the mouth. Formed in the tapered portion are dove tail slots to receive the tenons of slips. In this case three slips are shown.

The slips are arcuate in horizontal cross section and are indicated by 10. They are formed with tenons 11 slidably disposed in the slots in the socket. Upon moving the slips upwardly toward the top of the slots, they will recede from each other. The inner faces of the slips are corrugated to better grip any object or tool disposed therebetween. Brackets 12 are formed upon the top of the slips to receive pivot pins which secure links 13 to a head 14. The head is provided with a stem 15 slidably extending through an opening in the body 5 and into a chamber 16. Secured to the stem by threads is a nut 17 preventing withdrawal of the stem from the chamber. A lock nut 18 holds the nut 17 in position. Disposed between the body and the head 14 is a compression spring 19 tending to hold the slips in their lower position. The chamber 16 is closed at one side by means of a hand hole cover 20. There is an enlargement 22 at one side of the chamber and a detent 23 is mounted therein with the end thereof normally in the path of movement of the nuts 17 and 18. The recess 22 is so constructed that the detent engages a portion thereof which serves as a stop. A leaf spring 24 tends to hold the detent in position to be engaged by the nuts in their travel upwardly. It is obvious that as the stem 15 is moved upwardly, it will force the nuts 17 and 18 against the detent, move them beyond it, and the point of the detent will engage the under side of nut 17 holding the stem locked in this position. In the upper position the slips are also at the top of their travel and in their greatest expanded position.

A ring 25 is secured to the shell 9 forming a mouth for the tool and a stop for the slips. The ring 25 is interchangeable with a cap 26 which closes the lower end of the shell and is for a purpose later described.

Suppose it is desired to fish for an object such as a lost tool. The cap 26 is placed upon the end of the shell, and the fishing tool lowered until it comes in contact with the object. The cable is then marked in order that it may be known at what depth the lost tool is located. The fishing tool is then withdrawn, the cap 26 removed and replaced by ring 25. The slip and associated parts are normally in the position shown in Fig. 1. The fishing tool is then lowered until it has reached a depth indicated by the mark on the cable, and from then on lowered carefully over the lost tool, the latter entering the space between the slips, forcing the latter upwardly against the action of spring 19, until the slips have expanded sufficiently for the lost tool to enter therebetween. The fishing tool is then lifted, the slips contracting and gripping the lost tool. If the lost tool cannot be raised, the fishing tool should be released. This is accomplished by lowering the fishing tool so that the slips, stem, and nuts are raised to the point that the detent engages under nut 17 holding the slips in expanded position. Thereafter the fishing tool may be raised, its grip on the lost tool being released. The fishing tool is then raised to the surface and the cover 20 removed in order to release the detent from the stem.

What I claim is:

1. A fishing tool comprising a head, a socket detachably secured to said head having a tapered bore converging toward the mouth and provided with dove-tail slots on the tapered portion, slips having tenons mounted in said slots, a stem mounted in said socket so as to be freely slidable between the limits of its travel and connected to said slips by links and a detent disposed in said head to engage said stem and lock the latter adjacent the upper limit of its travel.

2. A fishing tool comprising a socket having a tapered bore converging toward the mouth and provided with dove-tail slots on the tapered portion, slips having tenons mounted in said slots, a stem slidably mounted in said socket so as to be freely slidable between the limits of its travel and connected to said slips by links, and a detent disposed to engage said stem and lock the latter adjacent the upper limit of its travel.

In witness that I claim the foregoing I have hereunto subscribed my name this 24th day of September, 1920.

DAVID A. BALL.